United States Patent

Reinecke

[11] 4,093,316
[45] June 6, 1978

[54] COMBINED ANTISKID AND LOAD-DEPENDENT BRAKE CONTROL SYSTEM FOR A MOTOR VEHICLE

[75] Inventor: Erich Reinecke, Beinhorn, Germany

[73] Assignee: WABCO Westinghouse GmbH, Hanover, Germany

[21] Appl. No.: 771,477

[22] Filed: Feb. 24, 1977

[30] Foreign Application Priority Data

May 21, 1976 Germany .............................. 2622746

[51] Int. Cl.² ........................... B60T 8/02; B60T 8/18
[52] U.S. Cl. ................................. 303/100; 303/22 R; 303/DIG. 1
[58] Field of Search ............... 303/100, DIG. 1, 22 R, 303/22 A

[56] References Cited

U.S. PATENT DOCUMENTS

| | | | |
|---|---|---|---|
| 3,632,177 | 1/1972 | Packer | 303/100 |
| 3,802,745 | 4/1974 | Strifler | 303/22 R |
| 3,890,013 | 6/1975 | Coiner | 303/100 |

Primary Examiner—Trygve M. Blix
Assistant Examiner—Reinhard J. Eisenzopf
Attorney, Agent, or Firm—R. W. McIntire, Jr.

[57] ABSTRACT

A combined vehicle antiskid and load-dependent brake control system in which digital control of the individual wheel brake pressure regulating valves is provided. These regulating valves may be operated individually or on a per axle basis to vary the brake pressure independent of the operator-controlled brake valve device. The load-dependent brake control portion of the system includes electronic control circuitry that is subject to the output signal of sensors, which monitor pressure supplied by the brake valve device, actual brake cylinder pressure and the load supported by the vehicle rear axle, in order to operate the regulating valve of at least one wheel brake cylinder such as to cause the wheel brake pressure to follow a predetermined curve that differs from a normal brake pressure buildup curve.

6 Claims, 12 Drawing Figures

COMBINED ANTISKID AND LOAD-DEPENDENT BRAKE CONTROL SYSTEM FOR A MOTOR VEHICLE

BACKGROUND OF THE INVENTION

The present invention relates to motor vehicle brake control apparatus including antiskid brake control and load-dependent brake control subsystems which act through regulating valve devices to influence the front and/or rear wheel brake pressure independent of the operator controlled brake pressure. In apparatus of the above type, the load-dependent brake control subsystem typically comprises sensors for measuring the brake pressure produced by the operator's brake valve device, sensors for measuring the actual pressure delivered to the wheel brake cylinders (since this latter pressure varies from the first mentioned pressure during operation of the wheel skid control), sensors for measuring the axle load and an electronic logic control circuit which produces appropriate output signals in response to which the regulating valve devices are controlled to adjust the wheel braking pressure to the wheel axle load, thereby permitting the operator to apply normal brake forces irrespective of the vehicle load.

Wheel antiskid control systems are well known in a great variety of forms to also influence wheel brake pressure in accordance with existing coefficients of friction between the vehicle wheels and the roadway. In one such exemplary form, the operator-controlled wheel brake pressure is supplied, held constant or vented via the regulating valve device in response to voltage signals produced by an electronic control portion of the antiskid system.

While it is known to combine the electronic antiskid control system with a mechanically-operated load-dependent brake control, such an arrangement is extremely costly to construct, is complicated and accordingly prone to malfunction.

Accordingly, systems have been developed wherein the load-dependent brake control employs a form of electronic sensing and control similar to that of the electronic antiskid control. However, these arrangements are also expensive in that they require a complicated electro-pneumatic valve design to permit actuation in accordance with different analog voltage levels. Furthermore, these arrangements suffer from a lack of accuracy due to tolerances in the magnetic force of attraction and possible voltage fluctuations.

SUMMARY OF THE INVENTION

The object of the present invention, therefore, is to provide an electronic-type, load-dependent brake control system in which digital control of the electro-pneumatic regulating valve devices is obtained to achieve improved control accuracy and a less expensive valve construction.

Briefly, this objective is attained by providing circuit means for generating different load modified brake pressures at the front and rear axle wheels. Sensors are provided to measure the axle load condition, operator-controlled brake pressure delivered by the brake valve, and individual wheel brake cylinder pressure. These sensor signals are fed to the circuit means to generate output signals, which are combined with the output signals of a wheel antiskid control for operating an electro-pneumatic valve device of at least one wheel brake cylinder of the axle whose respective brake pressure and load condition is sensed. In this way, the brake pressure in the wheel brake cylinders of at least one axle may be controlled according to at least one predetermined load modified brake pressure curve. Depending upon the type of vehicle, the brake pressure delivered to either the rear axle or to both the front and rear axles may be load-adjusted so as to either hold constant after building up to a load-determined cut-off point or to build up at a different rate after reaching a load-determined cut-off point.

In controlling the electro-pneumatic valves in a digital manner to influence the operator-controlled brake pressure, only a single level of relatively low power is needed to actuate the valves so that fast, positive switching of the valve positions is obtained for improved switching accuracy.

BRIEF DESCRIPTION OF THE DRAWINGS

In the drawings to which the following more detailed explanation refers.

DESCRIPTION AND OPERATION

Figure 1:
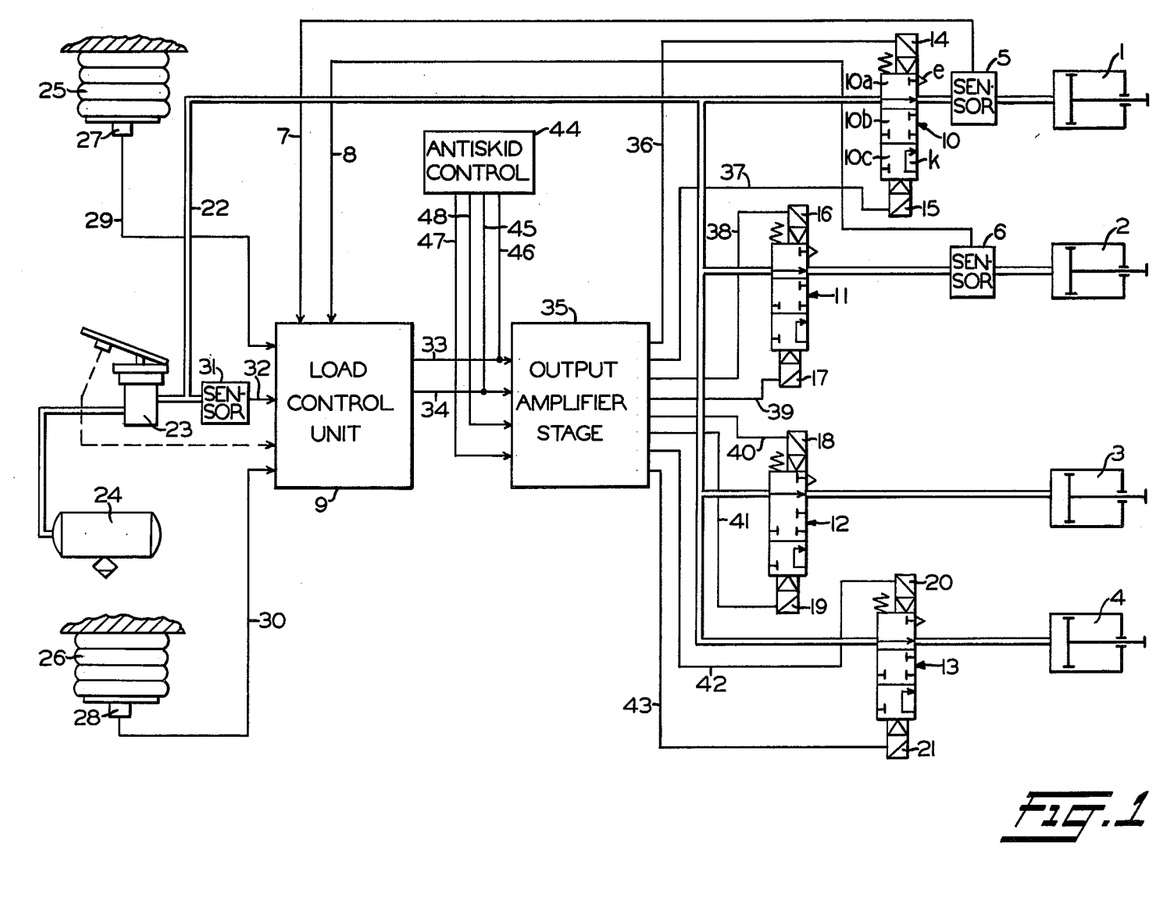
FIG. 1 shows a circuit diagrammatic according to one form of the present invention.

Referring now to FIG. 1, there is shown brake cylinders 1, 2 for the wheels of the rear axle of a motor vehicle and the brake cylinders 3, 4 for the wheels of the front axle. Connected in the pressure delivery lines leading to the respective cylinders 1, 2 are pressure sensors 5, 6 which convert the actual brake cylinder pressure $P_o$ into a corresponding electrical signal. These electrical signals from sensors 5, 6 are transmitted via lines 7, 8 to a control unit 9, whose function will be hereinafter explained.

There is provided for the respective wheel brake cylinders a three position electro-pneumatic valve device 10, 11, 12 and 13 having electro-magnetic operator portions 14–15, 16–17, 18–19 and 20–21. Typically, these electro-magnetic operators are solenoids of conventional design. A brake pressure delivery line 22 interposed between the electro-pneumatic valves 10–13 and an operator's brake valve device 23 delivers fluid pressure $P_i$ from a storage tank 24 at a value selected by the operator in accordance with the degree of braking desired. The fluid connections made by the respective three-position valves 10–13 are represented diagrammatically by envelopes 10a, 10b and 10c. In that each valve 10–13 operates the same way, only valve 10 will be described.

With solenoid operator 15 energized and solenoid 14 deenergized, the valve is positioned to establish the fluid connection represented by envelope 10a, as shown. This connection communicates fluid pressure in line 22 with brake cylinder 1 via sensor 5, thereby accommodating the normal supply and exhaust of brake cylinder pressure in accordance with operation of brake valve device 23. When the energized condition of solenoids 14 and 15 is reversed, i. e., solenoid 14 is energized and solenoid 15 is deenergized, the valve is positioned to establish the fluid connections represented by envelope 10b. These connections interrupt fluid pressure communciation between line 22 and brake cylinder 1, thereby holding brake cylinder pressure constant. When both solenoid operators 14 and 15 are energized simultaneously, the connections represented by envelope 10c are made, whereby pressure in line 22 is cut off from brake cylinder 1, which is in turn vented to atmosphere via channel K and exhaust port e.

Disposed between the vehicle body and rear axle is air spring 25, 26 having sensors 27, 28 which measure the pressure in the respective air springs and convert it into a corresponding electrical signal that is transmitted to control unit 9 as an indication of the degree of load supported by the wheels of the rear axle and, consequently, the intensity of braking capable of being attained before the rear axle wheels can be expected to lose adhesion and consequently skid.

While sensors 5, 6 and 27, 28 are commonly referred to as pressure transducers, which are conventional in a great variety of forms, one known type operates on the principle of varying the resistance of an electrical circuit in accordance with changes in a magnetic field brought about by the pressure change to which the pressure transducer is subject. The resultant change in the output voltage of the circuit is proportional to the pressure change, thus providing an accurate conversion of the control signal.

Connected to a branch of line 22 for measuring the delivery pressure $P_i$ provided by brake valve 23 is another sensor 31, which may be similar to sensors 5, 6 and 27, 28 in providing an electrical signal to control unit 9 via line 32 whose value is proportional to the delivery pressure $P_i$ in line 22.

Figure 10:
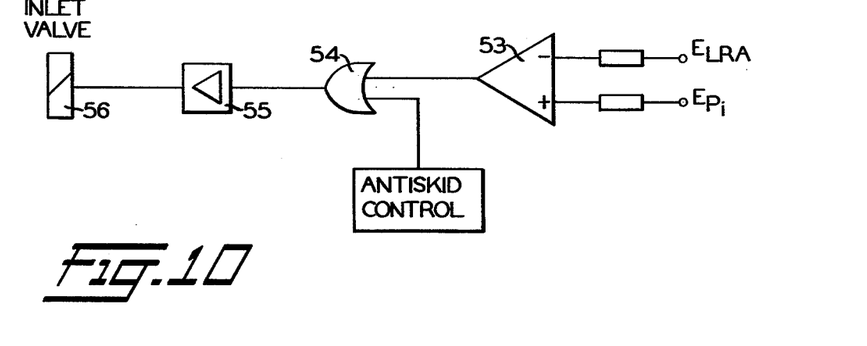
FIG. 10 shows a circuit for modifying the operator-controlled brake pressure according to the graph of FIG. 4.
Figure 11:
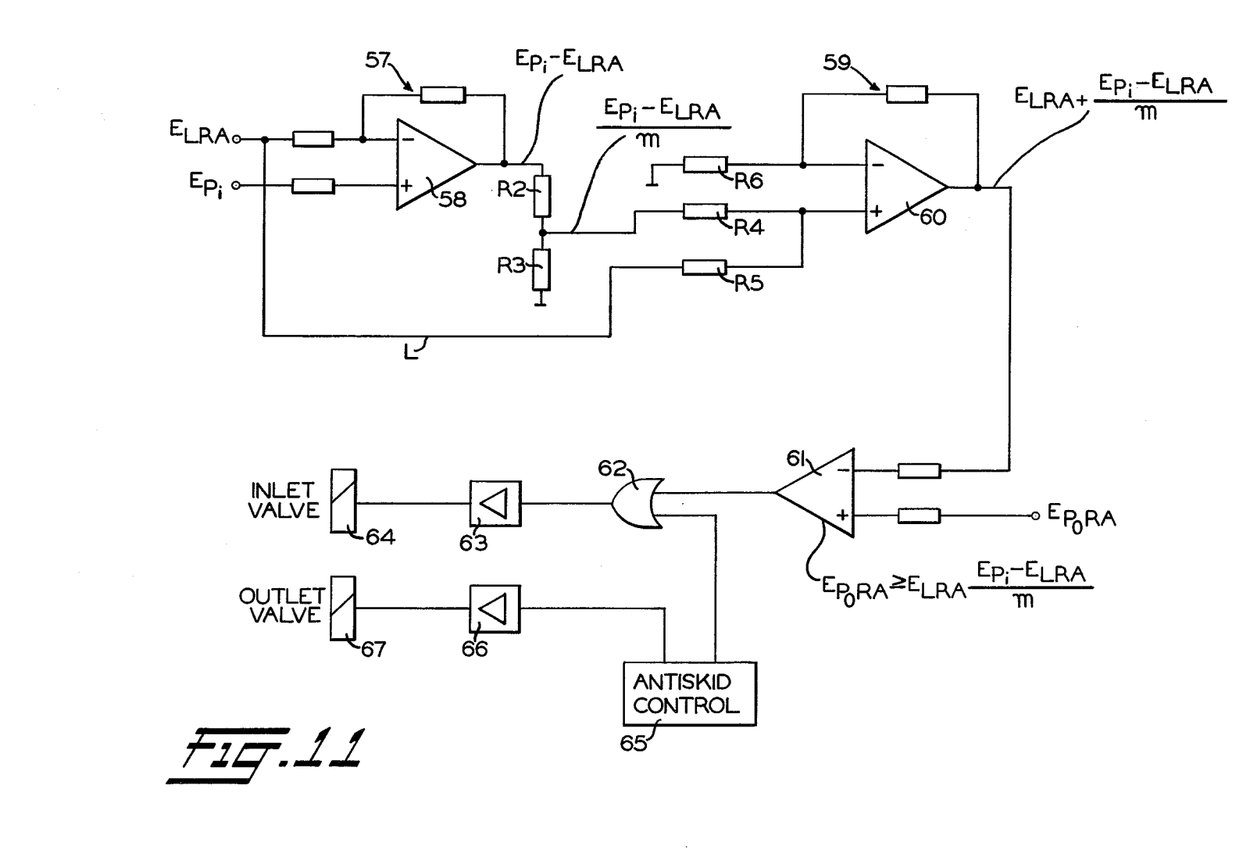
FIG. 11 shows a circuit for modifying the operator-controlled brake pressure according to the graph of FIG. 5.
Figure 12:
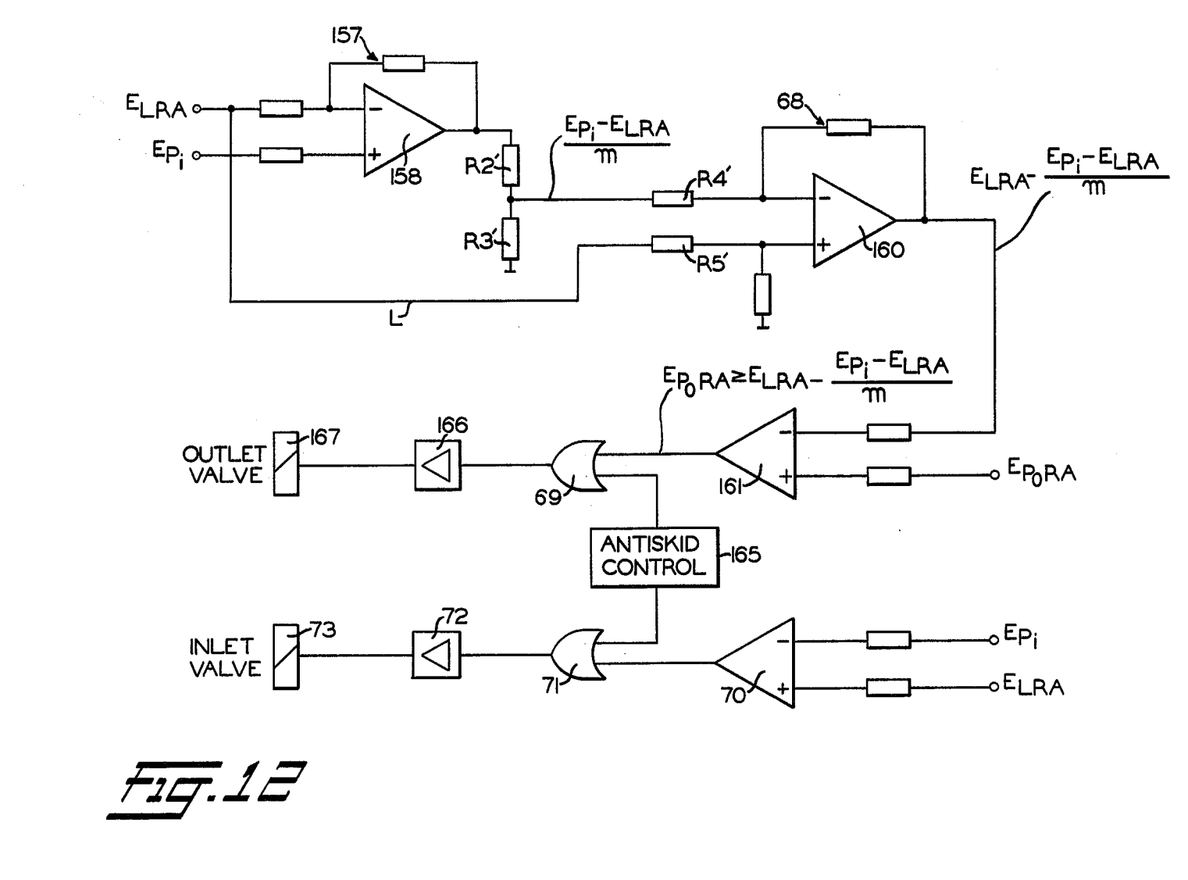
FIG. 12 shows a circuit for modifying the operator-controlled brake pressure according to the graph of FIG. 6.

Control unit 9 comprises circuitry arranged to process the signals derived from the delivery pressure $P_i$ supplied by brake valve 23, the pressure $P_o$ at the rear axle brake cylinders 1, 2 and the degree of vehicle load supported by the rear axle wheels. Examples of such circuits are shown in FIGS. 10, 11 and 12, which will be discussed hereinafter. Lines 33 and 34 connect the output of the circuits comprising control unit 9 to the final stage amplifiers represented by block 35, which forwards the amplified signal to the respective electromagnetic operators 14–21 of valves 10–13 via lines 36–43.

Also connected to block 35 is an antiskid control system 44 that modulates the brake pressure of the front and rear axle wheels via control signals transmitted to the final stage amplifiers 35 via lines 45, 46, which interconnect with lines 33, 34 from control unit 9, and via lines 47, 48, which lead directly to block 35.

In considering the operation of the system of FIG. 1, let it be understood that the vehicle brakes are designed so that under maximum load and ideal road conditions, a full brake application will not induce wheel skidding. With such conditions prevailing, therefore, the antiskid control system 44 is inactive insofar as providing any signals via lines 45–48 and the brake cylinders 1–4 of the front and rear axles are each connected with line 22 via valves 10–13, respectively. Each cylinder brake pressure $P_o$ is consequently controlled in accordance with operation of brake valve 23 and thus reflects the delivery pressure $P_i$ in line 22. In FIGS. 3–8 are shown characteristic brake force curves for the cylinders 1, 2 of the rear axle and cylinders 3, 4 of the front axle. In such instances where the delivery pressure $P_i$ and brake cylinder pressure $P_o$ are the same, the front axle brake force $P_{FA}$ and the rear axle brake force $P_{RA}$ normally increase linearly at a 1:1 ratio, i.e., providing the electropneumatic valves 10–13 are in the position shown.

Figure 3:
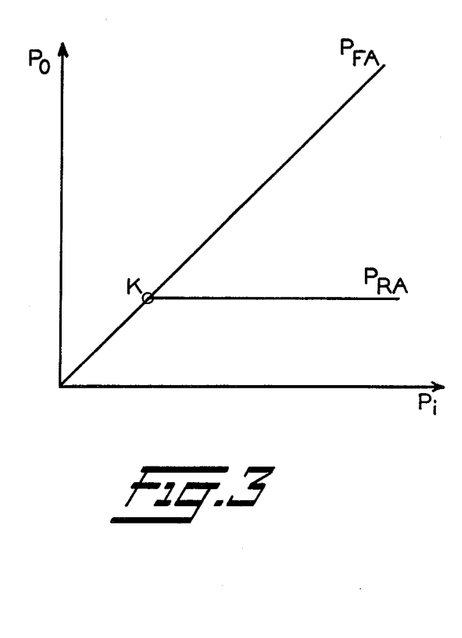
FIGS. 3-9 show graphs in which the operator-controlled front and/or rear axle brake cylinder pressure of the vehicle is modified under different load conditions of the respective axles.
Figure 4:
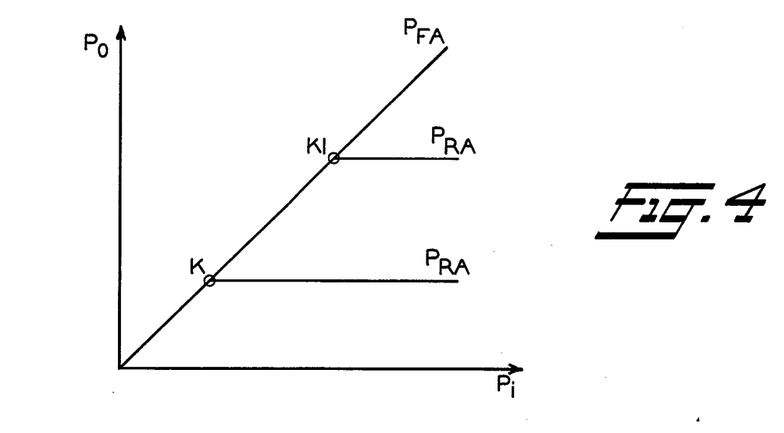

Now assuming the vehicle having the arrangement of FIG. 1 is running in an empty of partially loaded condition, it will be apparent that the possibility of a wheel skid condition arising at the wheels of the rear axle exists due to the reduced wheel to road adhesion resulting from the unloaded rear axle whose wheel brakes are designed to exert brake force for a maximum load condition. Such an impending wheel skid can be avoided by cutting off the supply of pressure $P_i$ to the rear axle brake cylinders 1, 2 at a preselected point K or $K_1$ on the characteristic brake force curve, as shown in FIGS. 3 and 4. This is accomplished by reason of control unit 9 receiving information concerning the vehicle load condition via lines 29, 30, which, together with the feedback information of the brake pressure effective at cylinders 1, 2 via lines 7, 8, results in output signals via lines 33, 34 of control unit 9 and amplifier 35 to cause the solenoids 14, 16 of the respective valves 10, 11 to be energized, while concurrently deenergizing solenoids 15, 17. Electro-pneumatic valves 10, 11 of the rear axle are thus shifted to a position in which the connection of delivery fluid pressure $P_i$ in line 22 is cut off from brake cylinders 1, 2 and the pressure $P_o$ therein is cut off from atmospheric port e to maintain pressure $P_o$ constant after reaching point K or $K_1$ on the characteristic brake force curve.

In order to provide this variable cut-off point K, $K_1$, control unit 9 may be provided with the circuit of FIG. 10. A voltage $E_{LRA}$ corresponding to the rear axle load, as detected by sensors 27, 28 of FIG. 1, is provided at one input of a comparator circuit 53. The other input of comparator circuit 53 is subject to a voltage $E_{Pi}$ corresponding to the pressure in line 22 delivered by brake valve 23 and detected by sensor 31. Whenever the voltage $E_{Pi}$ exceeds the voltage $E_{LRA}$, comparator 53 emits an output signal to a solenoid valve 56 via an OR gate 54 and amplifier 55. Solenoid valve 56 controls a two-way inlet valve (not shown), which interrupts supply of pressure $P_o$ to a rear axle cylinder when solenoid 56 is energized to hold the brake pressure constant until the delivery pressure voltage $E_{Pi}$ again drops below the rear axle load voltage $E_{LRA}$.

Also shown connected via the OR gate 54 is an antiskid brake control system capable of also energizing solenoid 56 to interrupt supply of pressure to the brake cylinder during a wheel skid condition.

Also shown connected via the OR gate 54 is an antiskid brake control system capable of also energizing solenoid 56 to interrupt supply of pressure to the brake cylinder during a wheel skid condition.

Figure 5:
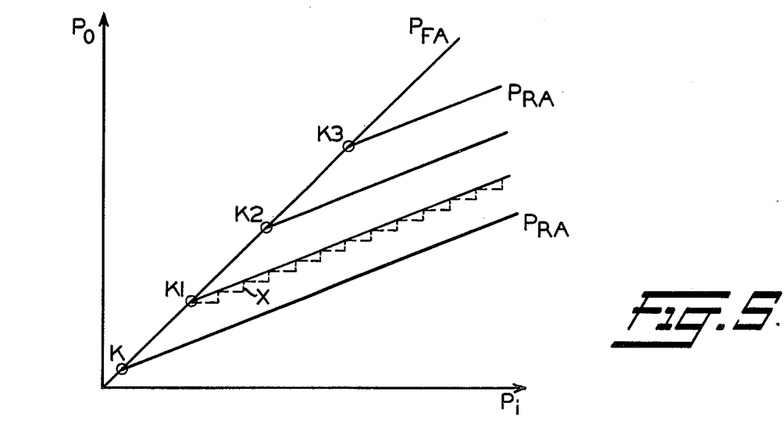

In certain cases, it may be desirable to gradually increase the rear axle brake pressure $P_{RA}$, as opposed to holding it constant after reaching point K, $K_1$, etc. As shown in FIG. 5, the ascending curve $P_{RA}$ corresponding to the rear axle brake force is simulated by intermittently supplying and holding constant the pressure $P_o$ of brake cylinders 1, 2, as indicated by the staircase curve X.

In order to properly control the electro-pneumatic valves 10, 11 of FIG. 1 to produce staircase curve X, control unit 9 of FIG. 1 is provided with the circuit of FIG. 11, which satisfies the expression $E_{PoRA} \geq (E_{LRA} + E_{Pi}/m) - E_{LRA}$, where $E_{PoRA}$ is a voltage corresponding to the output pressure of a rear axle brake cylinder 1 or 2, m is a chosen factor by which the slope of curve $P_{RA}$ of FIG. 5 is determined, $E_{Pi}$ is the voltage representing the delivery pressure of line 22 and $E_{LRA}$ is the voltage corresponding to the degree of load supported by the rear axle. The difference between $E_{Pi}$ and $E_{LRA}$ is formed in a subtractor circuit 57 consisting of an operational amplifier 58. The output voltage of amplifier 58 corresponding to the differential voltage is fed to an adder circuit 59 via resistor R4 and a voltage divider consisting of resistors R2-R3, which divides the output voltage of amplifer 58 by the chosen value m. Adder circuit 59 comprises an operational amplifier 60 having one input to which the new voltage $E_{Pi}$-$E_{LRA}$ is connected. Also connected to this same input of amplifier 60 via line L and a resistor R5 is the voltage $E_{LRA}$ corresponding to the rear axle load, as detected by a sensor 27 or 28 of FIG. 1. The other input of amplifier 60 is grounded via resistor R6. The output of amplifier 60 thus constitutes the sum value of the voltages $E_{LRA}$ + ($E_{Pi}$ − $E_{LRA}$ /m. This voltage is fed to one input of a comparator 61 where it is compared with the voltage $E_{PoRA}$ supplied to the other input of comparator 61, in accordance with the brake cylinder pressure of a wheel on the rear axle. When $E_{poRA} \geq (E_{Pi} - E_{LRA}/m$, an output signal is transmitted from comparator 61 to a solenoid valve 64 via an OR gate 62 and amplifier 63. Solenoid valve 64 may control a two-way inlet valve (not shown) that operates similar to the inlet valve described relative to FIG. 10. When energized by reason of comparator 61 releasing an output signal, solenoid 64 closes its inlet valve to interrupt the supply of fluid pressure $P_o$ to the wheel brake cylinder. The result of dividing voltage $E_{Pi}$ - $E_{LRA}$ and subsequently adding voltage $E_{LRA}$ is a lowering of the threshold at which comparator 61 produces an output signal to cause solenoid 64 to close its inlet valve earlier and subsequently open the inlet valve sooner in achieving the desired slope of the staircase curve X of FIG. 5.

Also connected with solenoid 64 via OR gate 62 is an antiskid control system 65, which is also connected via an amplifier 66 to a solenoid operator 67 of an exhaust valve (not shown). In this arrangement, a wheel skid condition will result in the inlet valve being closed and the outlet valve being opened when the respective solenoids 64, 67 are energized by the antiskid control to effect a reduction of brake pressure as opposed to simply holding the brake pressure constant, as in the arrangement of FIG. 10.

Figures 6, 7, 8:
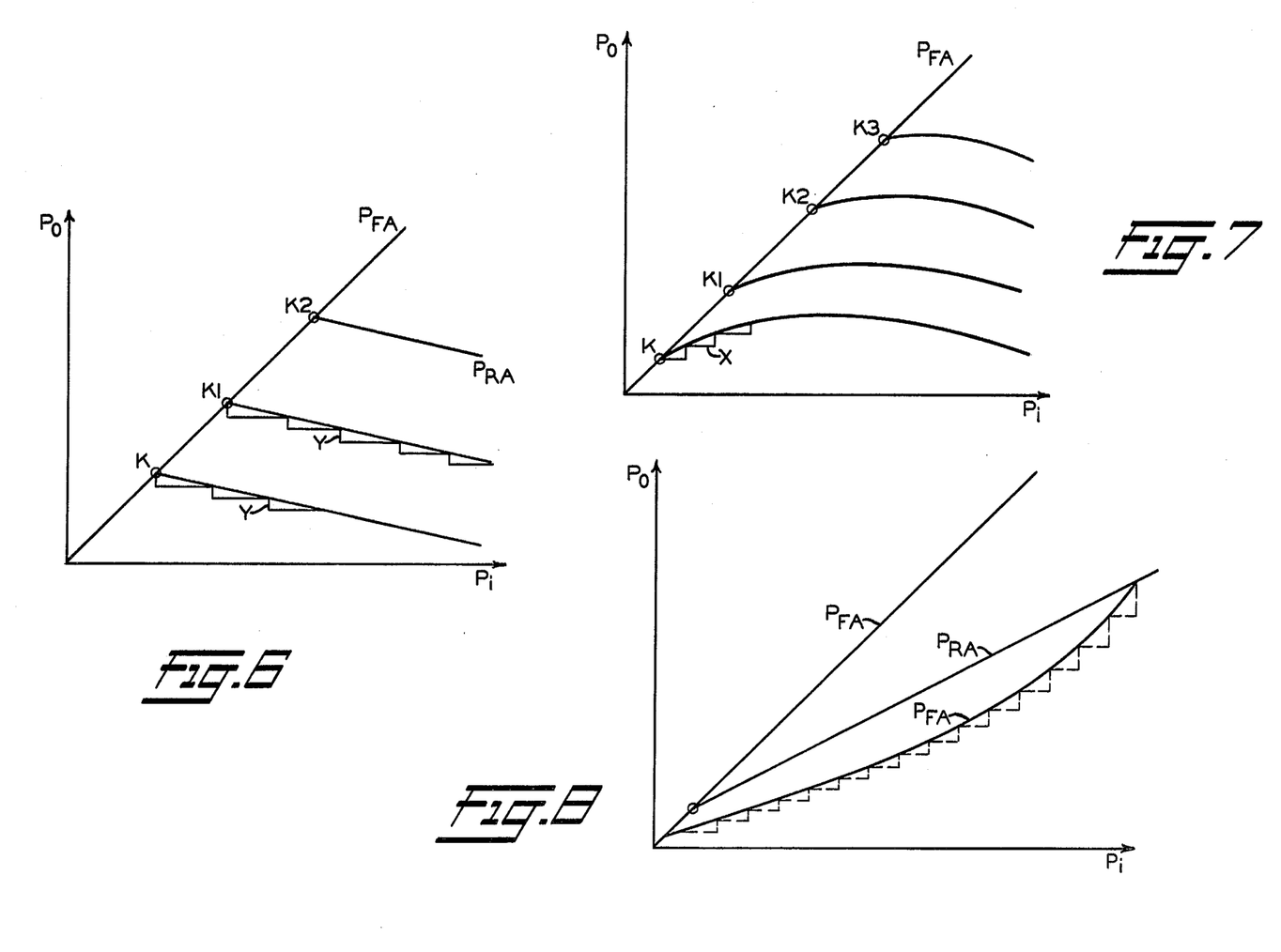

In FIG. 6 is shown a rear axle brake force curve in which the wheel brake cylinder pressure $P_{RA}$ gradually decreases after achieving the cut-off point K, K1, etc. Control of the brake pressure $P_{RA}$ in this manner may be advantageous for vehicles with a very short wheel base, in which case the dynamic axle load displacement is comparatively large. When braking such a vehicle, the load on the rear axle is dramatically reduced as a result of the forward tilting moment generated by the force of inertia, as the load is transferred to the front axle. In order to prevent the rear wheels from locking up due to the reduced adhesion, as the load is transferred during braking, brake pressure $P_o$ of the rear axle wheels must be reduced after reaching a predetermined cut-off point K, K1, etc. This is accomplished by simultaneously energizing solenoids 14, 15 of valve 10 and solenoids 16, 17 of valve 11 to position these valves in accordance with the connections represented in envelopes 10c and 11c. Brake pressure $P_o$ at the respective brake cylinders 1, 2 is accordingly vented via channel K and exhaust port e of valves 10 and 11 for a short interval of time, while delivery pressure in line 22 is cut off from the brake cylinders. Following this brief interval during which brake pressure $P_o$ is exhausted, solenoids 15 and 17 are deenergized, leaving solenoids 14 and 16 energized to cause valves 10, 11 to assume the position represented by envelopes 10b, and 11b. In this position of valves 10, 11, brake pressure $P_o$ is again held constant. This process of periodically exhausting the brake pressure is repeated to produce staircase curve Y, which closely assimilates the desired curve of brake pressure $P_{RA}$.

In FIG. 12 is shown a circuit similar to that of FIG. 11 for controlling the wheel brake pressure $P_o$ at the rear axle in accordance with curve $P_{RA}$ of FIG. 6. This circuit differs from that of FIG. 11 mainly in that the expression ($E_{Pi}$ − $E_{LRA}/m$ is subtracted from voltage $E_{LRA}$ instead of being added. The reference numerals identifying like parts of FIG. 12 with FIG. 11 are provided with corresponding reference numerals increased by 100.

When the pressure $P_i$ at the rear axle brake cylinders 1, 2 exceeds a predetermined limit value corresponding to the axle load, supply of pressure to the brake cylinders is interrupted. The subsequent exhaust and holding constant of the brake pressure is achieved according to the expression $E_{PoRA} \geq E_{LRA} (E_{Pi} - E_{LRA}/m)$ where $E_{PoRA}$ is the voltage corresponding to the rear axle brake cylinder pressure, $E_{LRA}$ is the voltage corresponding to the load supported by the rear axle, $E_{Pi}$ is the voltage corresponding to the delivery pressure, and m is a chosen factor by which the slope of curve $P_{RA}$ of FIG. 6 is determined. The difference between $E_{Pi}$ and $E_{LRA}$ is formed in a subtractor circuit 157 consisting of an operational amplifier 158. The output voltage of amplifier 158 corresponding to the differential voltage is fed to a voltage divider $R_2'$, $R_3'$, which divides this voltage by a factor m. The resulting voltage value ($E_{Pi}$ − $E_{LRA}/m$) is connected to a subtractor circuit 68 via resistor $R_4'$. Subtractor 68 consists of an operational amplifier 160 subject at one input to voltage ($E_{Pi}$ − $E_{LRA}/m$ and at the other input to the voltage $E_{LRA}$ via a line L and resistor $R_5'$. The output of subtractor circuit 68 thus produces the difference from the voltages $E_{LRA}$ − ($E_{Pi}$ − $E_{LRA}/m$ which is fed to one input of a comparator 161 for comparison with voltage $E_{PoRA}$ at the other input. When $E_{PoRA} \geq E_{LRA} - (E_{Pi} - E_{LRA}/m$, an output signal is transmitted from comparator 161 to a solenoid valve 167 via an OR gate 69 and an amplifier 166. In its energized state, solenoid 167 operates an exhaust valve (not shown) to vent brake pressure $P_o$ from the rear axle.

In order to hold the brake pressure $P_o$ at the rear axle constant when the pressure subsequently drops below a certain chosen value, there is provided a comparator 70 which generates an output signal to energize a solenoid 73 via OR gate 71 and amplifier 72 when the voltage $E_{Pi}$ at one input of the comparator corresponding to the brake delivery pressure becomes less than the voltage $E_{LRA}$ at the other input corresponding to the load supported by the rear axle. Solenoid 73 controls a supply valve (not shown) via which brake pressure is supplied.

Each OR gate 69, 71 has an input connecting an antiskid control system 165 to the respective exhaust valve solenoid 167 and the supply valve solenoid 73 in order to interrupt the supply of brake pressure, while concurrently exhausting brake pressure in response to an output from the antiskid control system.

By maintaining constant the brake cylinder pressure $P_o$ for different periods of time and alternately supplying pressure to the brake cylinders 1 and 2 for different periods of time during successive cycles, a staircase curve X may be formed such as shown in FIG. 7 wherein a brake pressure buildup curve $P_{RA}$ is approximated having an arcuate shape.

Figure 2:
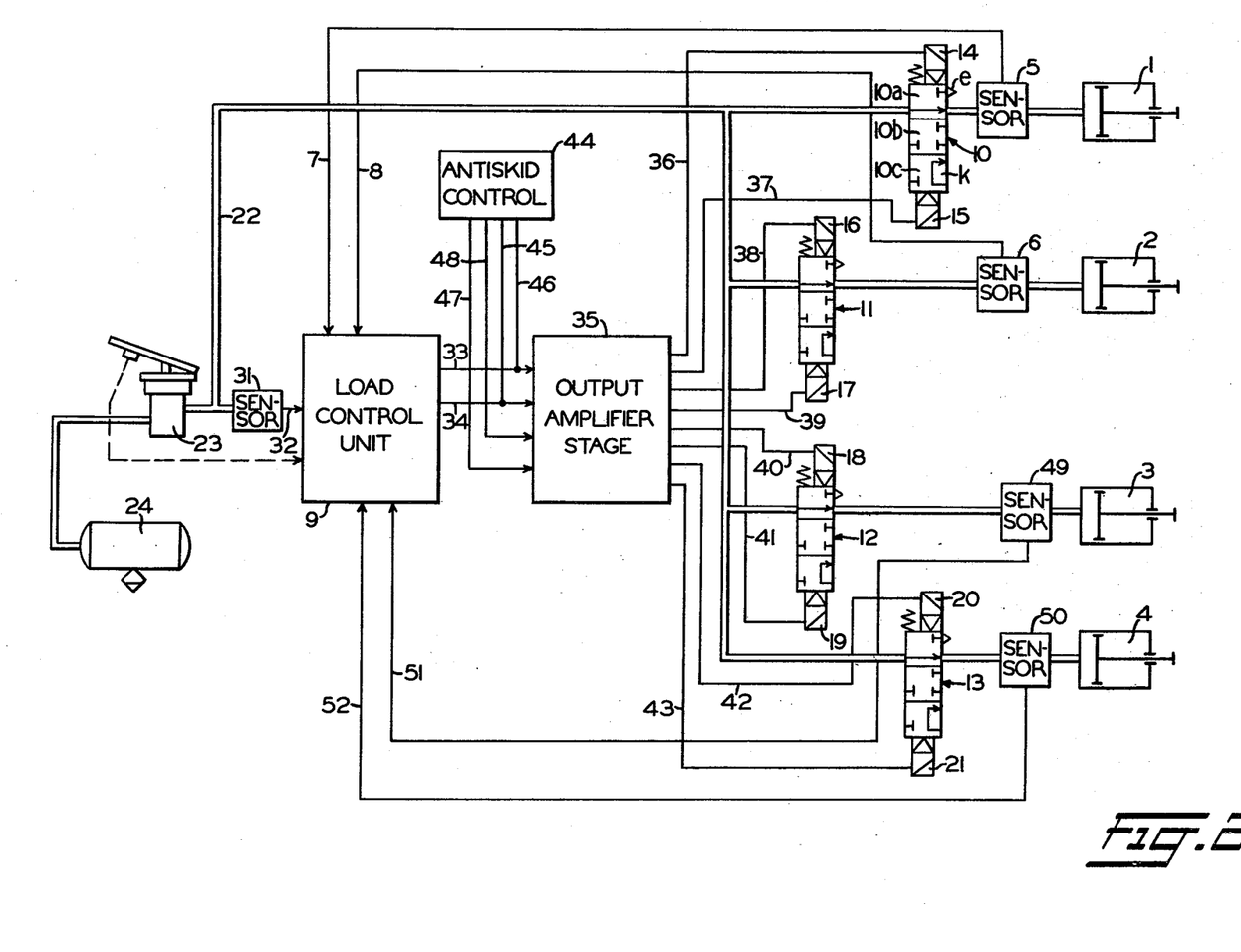
FIG. 2 shows a circuit diagrammatic according to an alternate form of the invention.
Figure 9:
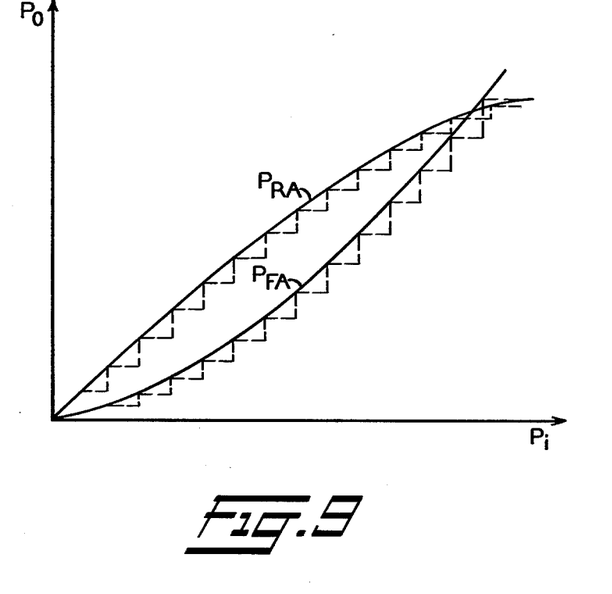

In referring now to the circuit of FIG. 2, it will be seen that this circuit differs from that of FIG. 1 only to the extent that the front axle brake cylinders 3, 4 are provided with pressure sensors 49, 50 similar to sensors 5, 6 of the rear axle cylinders 1, 2. These sensors 49, 50 measure the front axle brake cylinder pressure $P_o$ and provide a corresponding voltage signal to control unit 9 via lines 51, 52. In this way, the front axle wheel brake pressure can be adjusted as well as the rear axle brake pressure. By properly actuating the three-position valves 10–13 of brake cylinders 1–4, it is possible to control the brake pressure buildup in the respective front and rear axle cylinders to approximate the curves $P_{FA}$ and $P_{RA}$ in FIGS. 8 and 9.

From the foregoing, it will be appreciated that the brake pressure development can be controlled in accordance with a predetermined characteristic curve. This has the advantage of adjusting or setting up the electronic control portion in accordance with the axle load condition and braking behavoir of any commerical vehicle to provide the desired brake pressure buildup, without excessive cost.

Having now described the invention, what I claim as new and desire to secure by Letters Patent, is:

1. An antiskid brake control system for motor vehicles comprising:
    (a) a reservoir in which fluid under pressure is stored;
    (b) a brake cylinder device for each wheel of the vehicle;
    (c) an operator controlled brake valve device via which the fluid pressure from said reservoir is supplied to said brake cylinder devices in accordance with the degree of braking desired;
    (d) valve means interposed between said brake valve device and said brake cylinder devices for influencing braking pressure independently of said brake valve device;
    (e) antiskid control means for effecting operation of said valve means during wheel skid conditions;
    (f) sensor means for providing output signals corresponding to the brake valve regulated supply fluid pressure, the effective brake cylinder pressure and the load supported by the respective axles of the vehicle; and
    (g) load control means subject to the sensor output signals for effecting operation of said valve means to influence the fluid pressure of said brake cylinder device of a chosen one of the respective vehicle axles so as to follow a predetermined brake cylinder pressure buildup curve that deviates from a normal buildup curve at a predetermined point thereon corresponding to the time when the brake valve supply pressure signal exceeds the signal of the load supported by the chosen axle.

2. A fluid pressure brake control system, as recited in claim 1, further characterized in that said electronic circuit means provides digital control signals.

3. A fluid pressure brake control system, as recited in claim 1, wherein said predetermined brake pressure buildup curve beyond said predetermined point represents a holding constant of the brake pressure.

4. A fluid pressure brake control system, as recited in claim 1, wherein said predetermined brake pressure buildup curve beyond said predetermined point represents a reduction of the brake pressure.

5. A fluid pressure brake control system, as recited in claim 1, wherein said predetermined brake pressure buildup curve beyond said predetermined point represents an increase of brake pressure at a rate less than that of the normal brake pressure buildup.

6. A fluid pressure brake control system, as recited in claim 1, further comprising means for interconnecting a plurality of control signals provided by said antiskid brake control apparatus and the control signals provided by said load-dependent brake control apparatus, whereby said valve means are conjointly controlled.

* * * * *